Patented Apr. 15, 1924.

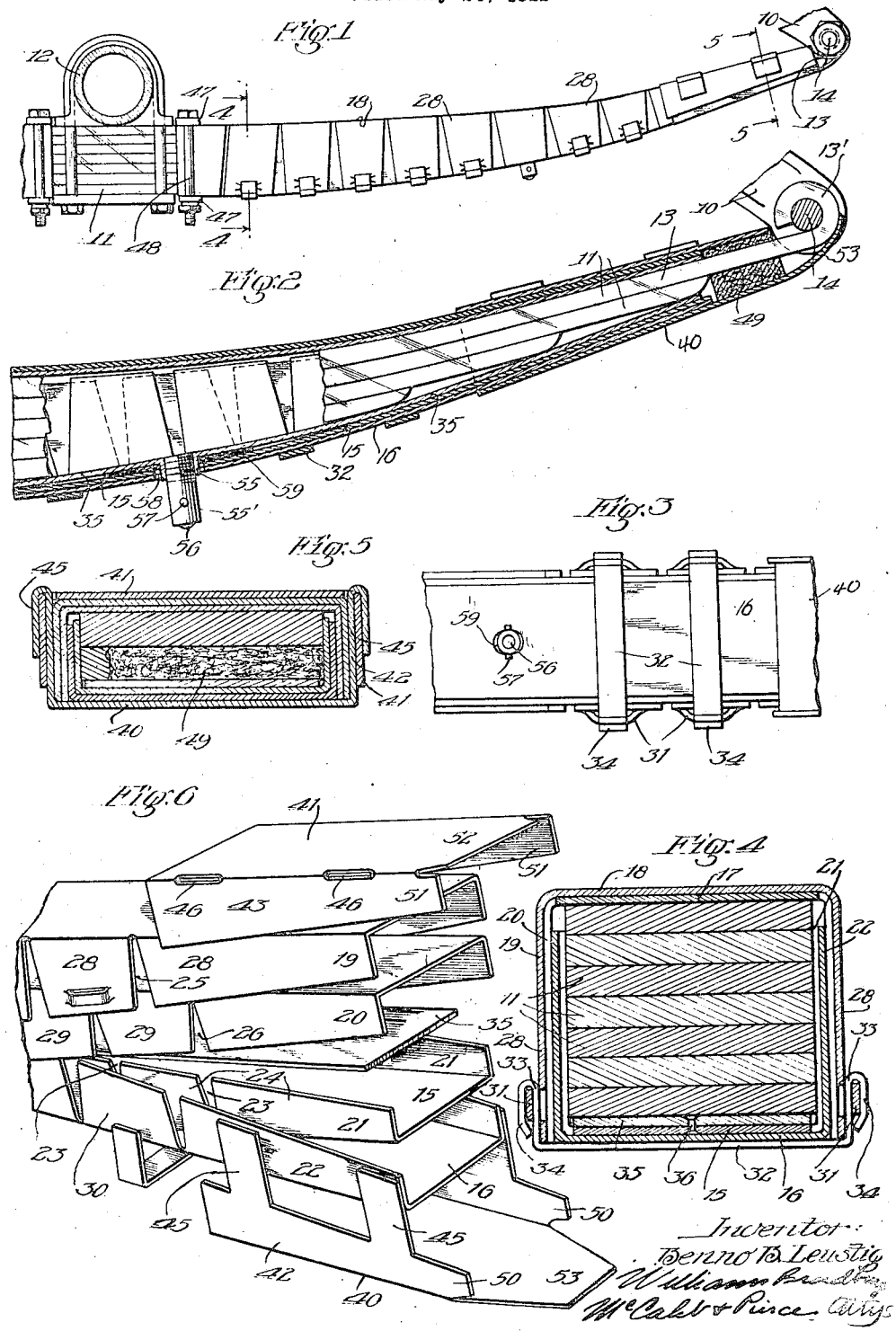

1,490,331

UNITED STATES PATENT OFFICE.

BENNO B. LEUSTIG, OF CLEVELAND, OHIO, ASSIGNOR TO THE LEUSTIG METAL SPRING COVER COMPANY, OF CLEVELAND, OHIO, A CORPORATION OF OHIO.

SPRING COVER.

Application filed May 24, 1922. Serial No. 563,187.

*To all whom it may concern:*

Be it known that I, BENNO B. LEUSTIG, a citizen of the United States, and resident of Cleveland, in the county of Cuyahoga and State of Ohio, have invented a certain new and useful Improvement in Spring Covers, of which the following is a full, clear, concise, and exact description, reference being had to the accompanying drawings, forming a part of this specification.

My invention relates to improvements in spring covers, and is particularly concerned with the provision of a novel type of metal spring cover to be used on the laminated springs of automobiles and other vehicles.

The objects of my invention are:

First: To provide a flexible cover for the laminated springs of automobiles and other vehicles, which will effectually exclude dirt, dust and water from the springs, and at the same time embody means for insuring the proper lubrication of the springs;

Second: To provide a cover of the character described, which, within certain limitations, is adjustable to springs of different lengths;

Third: To provide a spring cover which is made entirely of metal, but which at the same time has sufficient flexibility to accommodate itself to the movements of the springs;

Fourth: To provide a metal spring cover comprising two channel shaped members, one of which is inverted relatively to the other, the flanges of the two channels being positioned in overlapping relation and notched to provide the necessary flexibility, the notches forming a plurality of longitudinally spaced tongues, the tongues of one channel being positioned to cover the notches in the other channel;

Fifth: To provide a spring cover of the character described, in which means are provided for connecting the outer ends of oppositely disposed tongues on the outer channel so as to form a plurality of independently movable sections;

Sixth: To provide a cover of the type described comprising means for rigidly securing the two channel shaped members together, and at the same time protecting the channel shaped member which is engaged by the ends of the spring laminations against injury upon the rebound of the spring, the same means acting as a snubber;

Seventh: To provide novel and improved means of supplying lubricant under pressure to the spring, and Finally: To provide means for sealing the cover to the spring so as to prevent the escape of lubricant therefrom.

The above and other objects will be apparent as this description progresses, reference being had to the accompanying drawings, in which—

Figure 1 is a side elevation of a quarter elliptical spring provided with one of my metal covers;

Figure 2 is a central longitudinal section through a portion of the spring cover as applied to a spring;

Figure 3 is a fragmentary bottom view;

Figure 4 is a transverse section taken on line 4—4 of Figure 2;

Figure 5 is a similar view taken on line 5—5 of Figure 1, and

Figure 6 is an exploded perspective view, illustrating the manner in which the various parts are assembled relatively to each other.

Throughout the several views, similar reference characters will be used for referring to similar parts.

In Figure 1, I have illustrated the forward end 10 of a side channel of an automobile chassis, to which is secured the spring 11 which is supported from axle 12, these two members being secured together by a well known means, the particular construction of which is not essential to my invention. The upper lamination, or leaf, 13, of the spring is provided at its outer end with an eye 13′ for receiving the shackle bolt 14 which secures it to the free end of the channel bar 10. The construction just described, as well as the construction of the spring itself, which comprises a plurality of spring leaves or laminations, is well known, and further reference thereto is unnecessary.

My improved spring cover comprises two pairs of nested channel shaped members. The inner pair of channel shaped members comprises the channel shaped members 15 and 16 (see Figure 4), and the outer pair of channel shaped members comprises the channel shaped members 17 and 18. The last mentioned channel shaped members are inverted relatively to the first pair, and the flanges 19 and 20 of these inverted channel shaped members enclose the flanges 21 and 22 of the first mentioned pair, as shown in Figure 4. Notches 23, cut through the flanges 21 of the channel shaped member 15, form a plurality of longitudinally spaced tongues 24, and at the same time render this channel shaped member flexible so that it can flex in a plane parallel with its flanges. Similar notches 25, 26 and 27, cut through the flanges 19, 20 and 22 of the channel shaped members 18, 17 and 16, render these channel shaped members flexible in planes parallel with their flanges, and at the same time form the longitudinally spaced tongues 28, 29 and 30 on the channel shaped members 18, 17 and 16.

When the channel shaped members are assembled upon the spring, as shown in the various figures, 1 to 5 inclusive, the tongues 30 cover the notches 23 between the tongues 24; the tongues 29 cover the notches 27 between the tongues 30; and the tongues 28 cover the notches 26 between the tongues 29, so as to provide a longitudinally flexible but liquid-tight casing for enclosing the spring.

For securing the two pairs of channel shaped members together, I provide the free ends of each of the tongues 28 of the channel shaped member 18 with a struck out portion forming a loop 31, and then provide a clip 32 which is made from a strip of sheet metal having the up-turned ends 33, which can be inserted through the loops 31 of a pair of oppositely disposed tongues and then turned outwardly over these loops, as shown at 34 in Figure 4.

For the purpose of reinforcing the bottom of the channel shaped member 15 against the thrusts of the ends of the spring leaves during rebound of the spring, and at the same time to limit, as much as possible, this rebound, I provide the longitudinally extending metal strip 35, which may, if desired, be secured to the bottom of the channel shaped member 15 by means of a rivet or rivets 36. This strip is made sufficiently thick to enable it to withstand the thrusts of the ends of the spring leaves.

At the end of the spring cover, adjacent the eye 13', I provide the two channel shaped members 40 and 41, the flanges 42 and 43 of which overlap, as shown in Figures 1 and 5. The flanges 42 are each provided with a pair of spaced tongues 45 which project through slots 46 formed in the corners of the channel shaped member 41, and are bent outwardly and downwardly alongside the flanges of the channel shaped member 41, as shown in Figures 1 and 5, to secure these two channel shaped members together on the outer end of the cover. The two channel shaped members 41 and 42 can be shifted longitudinally of the remaining portion of the cover to adjust the cover to springs varying slightly in length. The inner ends of the two pairs of channel shaped members are secured to the spring by means of the cross bars 47 and the bolts 48.

For the purpose of sealing the cover upon the spring, so as to prevent the escape of lubricant therefrom, I prefer to insert short pieces of felt 49 between the top and bottom sides of the spring leaf 13 and the adjacent channel shaped members, as shown in Figures 2 and 5, and to hold these pieces of felt in place, I form extensions 50 on the flanges 42 of the channel shaped member 40, and extensions 51 and 52 on the channel shaped member 41, which can be bent inwardly around the outsides of the felt strips 49 to hold them in place against the pressure of the lubricant. I also provide the bottom of the channel shaped member 40 with an extension 53 which can be bent around the eye 13' of the upper leaf of the spring to anchor the channel shaped members 41 and 42.

For the purpose of supplying lubricant to the spring, I form a nipple 55 on the strip 35, to which is secured the inner end of the lubricant conducting member 55', which is here illustrated as being one of the fittings forming a part of a well known system of lubrication, this fitting being provided with a spring pressed closure 56, and a pin 57 projecting from the side thereof, for making a detachable connection with a lubricant compressor, capable of forcing lubricant into the casing or cover under high pressure. The particular construction of the lubricant conducting member 55' forms no part of my present invention as long as it is capable of introducing lubricant into the interior of the cover.

The bottoms of the channel shaped members 15 and 16 are provided with suitable openings 58 through which the lubricant conducting member 55' projects, these openings being elongated in the direction of the length of the cover to permit relative movement of the two channel shaped members and the lubricant conducting device when the spring flexes. To prevent the escape of lubricant through the openings in the bottoms of the channel shaped members 15 and 16, I prefer to insert a circular gasket 59 between the strip 35 and the bottom of the channel shaped member 15, as shown in Figure 2.

While I have described the details of construction of the preferred embodiment of my invention, it is to be clearly understood that my invention is not limited to these details, but is capable of other adaptations and modifications within the scope of the appended claims.

Having thus described my invention, what I claim as new and desire to secure by Letters Patent of the United States is:

1. A cover for a laminated spring comprising a pair of elongated nested metal channels, the flanges of which are notched at spaced intervals to provide spaced tongues, the tongues of one channel being positioned to cover the notches of the other channel, a second pair of similar nested channels inverted and having their flanges enclosing the flanges of said first named pair of channels, the tongues of the inner channel of said second pair of channels being positioned to cover the notches between the tongues of the outer channel of said first mentioned pair of channels, means for securing said pairs of channels together, a metal strip covering the inside of the bottom of one of the inside channels of one of said pairs of channels, a lubricant conducting member opening through and secured to said metal strip, the bottoms of the adjacent channels being provided with registering openings through which said lubricant conducting member extends, a gasket surrounding said lubricant conducting means, and positioned between said metal strip and the bottom of the adjacent channel, a short channel section covering the ends of each pair of channels and adapted to be positioned adjacent the eye of the spring, the flanges of said short sections being overlapping and the outer ends of said short sections being inwardly bendable, and a packing member coacting with said bendable ends to form a seal between said cover and a spring.

2. A cover for a laminated spring comprising a pair of elongated nested metal channels, the flanges of which are notched at spaced intervals to provide spaced tongues, the tongues of one channel being positioned to cover the notches of the other channel, a second pair of similar nested channels inverted and having their flanges enclosing the flanges of said first named pair of channels, the tongues of the inner channel of said second pair of channels being positioned to cover the notches between the tongues of the outer channel of said first mentioned pair of channels, means for securing said pairs of channels together, a metal strip covering the inside of the bottom of one of the inside channels of one of said pairs of channels, a lubricant conducting member opening through and secured to said metal strip, the bottoms of the adjacent channels being provided with registering openings through which said lubricant conducting member extends, a gasket surrounding said lubricant conducting means and positioned between said metal strip and the bottom of the adjacent channel, and a short channel section covering the ends of each pair of channels and adapted to be positioned adjacent the eye of the spring.

3. A cover for a laminated spring comprising a pair of elongated nested metal channels, the flanges of which are notched at spaced intervals to provide spaced tongues, the tongues of one channel being positioned to cover the notches of the other channel, a second pair of similar nested channels inverted and having their flanges enclosing the flanges of said first named pair of channels, the tongues of the inner channel of said second pair of channels being positioned to cover the notches between the tongues of the outer channel of said first mentioned pair of channels, means for securing said pairs of channels together, a metal strip covering the inside of the bottom of one of the inside channels of one of said pairs of channels, a lubricant conducting member opening through and secured to said metal strip, the bottoms of the adjacent channels being provided with registering openings through which said lubricant conducting member extends.

4. A cover for a laminated spring comprising a pair of elongated nested metal channels, the flanges of which are notched at spaced intervals to provide spaced tongues, the tongues of one channel being positioned to cover the notches of the other channel, a second pair of similar nested channels inverted and having their flanges enclosing the flanges of said first named pair of channels, the tongues of the inner channel of said second pair of channels being positioned to cover the notches between the tongues of the outer channel of said first mentioned pair of channels, means for securing said pairs of channels together, a metal strip covering the inside of the bottom of one of the inside channels of one of said pairs of channels, and a lubricant conducting member opening through and secured to said metal strip, the bottoms of the adjacent channels being provided with registering openings through which said lubricant conducting member extends.

5. A cover for a laminated spring comprising a pair of elongated nested metal channels, the flanges of which are notched at spaced intervals to provide spaced tongues, the tongues of one channel being positioned to cover the notches of the other channel, a second pair of similar nested channels inverted and having their flanges enclosing the flanges of said first named pair of channels, the tongues of the inner channel of said second pair of channels being positioned to cover the notches between the tongues of the outer channel of said first mentioned pair of channels, means for securing said pairs of channels together, and a metal strip covering the inside of the bottom of one of the inside channels of one of said pairs of channels, and a lubricant conducting member secured to said metal strip.

6. A cover for a laminated spring comprising a pair of elongated nested metal channels, the flanges of which are notched at spaced intervals to provide spaced tongues, the tongues of one channel being positioned to cover the notches of the other channel, a second pair of similar nested channels inverted and having their flanges enclosing the flanges of said first named pair of channels, the tongues of the inner channel of said second pair of channels being positioned to cover the notches between the tongues of the outer channel of said first mentioned pair of channels, means for securing said pairs of channels together, a short channel section covering the ends of each pair of channels and adapted to be positioned adjacent the eye of the spring, the flanges of said short sections being overlapping and the outer ends of said short sections being inwardly bendable, and a packing member co-acting with said bendable ends to form a seal between said cover and a spring.

7. A cover for a laminated spring comprising a pair of elongated nested metal channels, the flanges of which are notched at spaced intervals to provide spaced tongues, the tongues of one channel being positioned to cover the notches of the other channel, a second pair of similar nested channels inverted and having their flanges enclosing the flanges of said first named pair of channels, the tongues of the inner channel of said second pair of channels being positioned to cover the notches between the tongues of the outer channel of said first mentioned pair of channels, the flanges of the channels of each of said pairs terminating short of the webs of the channels of the other pair to permit relative movement between the channel members, and means for securing said pairs of channels together, and a short channel section covering the ends of each pair of channels and adapted to be positioned adjacent the eye of the spring, the flange of said short sections being overlapping.

8. A covering for a laminated spring comprising two channel shaped members, the flanges of each of which are notched to provide a plurality of oppositely disposed longitudinally spaced tongues, one of said channel shaped members being inverted relatively to the other and having its tongues covering the notches in said other channel, some of the oppositely disposed tongues of the outer channel each being provided with an outwardly struck portion forming a loop, and a locking clip extending across the outer side of the bottom of the other channel shaped member and having its respective ends extending through the loops on said oppositely disposed tongues and bent back over said loops.

9. A covering for a laminated spring comprising a pair of channel shaped members participating in the formation of a casing, the flanges of each of said channel shaped members being notched to provide a plurality of oppositely disposed longitudinally spaced tongues, one of said channel shaped members being inverted relatively to the other and having its tongues covering the notches in said other channel shaped member, and means connecting the free ends of some of the pairs of oppositely disposed tongues, the connecting means for each pair of tongues being independent of the connecting means of other pairs.

10. A covering for a laminated spring comprising two flexible channel shaped members, one of said channel shaped members being inverted relatively to the other and having its flanges overlapping the flanges of said other channel and provided with outwardly struck portions forming loops, and a sheet metal locking clip extending across the outer side of the bottom of the other channel shaped member and having its ends extending through the loops on said flanges and bent back over said loops.

11. A covering for a laminated spring comprising a flexible metal strip having at each edge a plurality of spaced outwardly projecting tongues, some of said tongues having shoulders formed thereon, a second flexible metal strip participating with said first named strip in the formation of a casing for said spring, and clips engaging the outside of said second metal strip and said shoulders for securing said flexible metal strips together.

12. A covering for a laminated spring comprising two spaced metal strips, the corresponding longitudinal edges of which lie in substantially the same planes, spaced tongues projecting from each edge of one strip towards the adjacent edges of the other strip, and metal clips secured to said tongues and engaging the other strip to hold said strip against further separation.

13. A covering for a laminated spring comprising two flexible metal members co-acting to form an elongated casing, one of said members having a shoulder formed thereon, and means for securing said members together comprising a metal strip co-acting with said shoulder and engaging the other member.

14. A casing for a laminated spring of the character indicated having two oppositely disposed flexible parts arranged to form the top and bottom respectively of the casing, one of said parts of the casing having, at each of a plurality of points spaced longitudinally of the casing, a pair of substantially oppositely disposed tongues which are arranged to participate in the formation of opposite sides respectively of the casing and held, independently of other oppositely disposed tongues, in the required relation to the other of the aforesaid parts of the casing.

15. A casing for a laminated spring having two oppositely disposed flexible parts arranged to form the top and bottom respectively of the casing, the bottom-forming part having longitudinally spaced upwardly projecting tongues arranged to participate in the formation of the sides of the casing, and the top-forming part having longitudinally spaced pairs of substantially oppositely disposed downwardly projecting tongues which are arranged to participate in the formation of the sides of the casing and held, adjacent the bottom of the casing and independently of other oppositely disposed tongues, in the required relation to the aforesaid bottom-forming part.

16. A casing for a laminated spring having two oppositely disposed flexible parts arranged to form the top and bottom respectively of the casing, one of said parts comprising, at each of a plurality of points spaced longitudinally of the casing, a pair of substantially oppositely disposed tongues which are arranged to participate in the formation of opposite sides respectively of the casing and connected together, independently of the connection between other oppositely disposed tongues, at the outer side of the other of the aforesaid parts.

17. A casing for a laminated spring having two oppositely disposed flexible parts forming the top and bottom respectively of the casing, the bottom-forming part having longitudinally spaced upwardly projecting tongues arranged to participate in the formation of the sides of the casing, and the top-forming part having, at each of a plurality of points spaced longitudinally of the casing, a pair of substantially oppositely disposed downwardly projecting tongues which are arranged to participate in the formation of opposite sides respectively of the casing and connected together, independently of the connection between other oppositely disposed tongues, at the bottom of the casing.

18. A flexible metal casing for a laminated spring comprising a longitudinal reinforcing metal strip internally of the casing, said strip being arranged to receive the thrusts of leaves of the spring during rebounds of the spring, and means for feeding lubricant inwardly through said reinforcing strip.

19. A flexible metal casing for a laminated spring comprising a longitudinal reinforcing metal strip internally of the casing, said strip being arranged to receive the thrusts of leaves of the spring during rebounds of the spring, said strip and the adjacent portion of the casing being provided the one with a lubricant-conducting member and the other with an opening which is elongated endwise of the casing and engaged by said lubricant-conducting member, and said lubricant-conducting member being arranged to feed lubricant inwardly through said strip.

20. A casing for a laminated spring having two oppositely disposed flexible parts extending longitudinally of the casing, and arranged to form the top and bottom respectively of the casing, said parts having tongues arranged to form the sides of the casing, and a reinforcing strip arranged internally and extending longitudinally of the casing and disposed to receive the thrusts of leaves of the spring during rebounds of the spring, the aforesaid oppositely disposed parts being connected together at points spaced longitudinally of said reinforcing strip.

21. A cover for a laminated spring comprising an elongated metal channel, the flanges of which are notched at spaced intervals to provide spaced tongues, a second similar channel inverted and having its flanges enclosing the flanges of said first channel, the tongues of the inner channel being positioned to cover the notches between the tongues of the outer channel and terminating short of the web of said outer channel to permit relative movement between the channel members, and means for securing said channel members together.

In witness whereof, I hereunto subscribe my name this 19th day of May, 1922.

BENNO B. LEUSTIG.

Witnesses:
WM. T. BLACK,
C. H. DORER.